Patented Dec. 30, 1924.

1,520,801

UNITED STATES PATENT OFFICE.

LEONARD HUGH BONNARD, OF LONDON, ENGLAND.

MANUFACTURE OF VEGETABLE CHARCOAL.

No Drawing.   Application filed December 21, 1922.   Serial No. 608,359.

*To all whom it may concern:*

Be it known that I, LEONARD HUGH BONNARD, a subject of the King of England, residing in London, England, have invented certain new and useful Improvements in the Manufacture of Vegetable Charcoal, of which the following is a specification.

This invention consists of improvements in or relating to the manufacture of vegetable charcoal, sometimes referred to as active charcoal, and it has for its object to provide a charcoal which shall be particularly effective in purifying, clarifying or sterilizing liquids or solutions; that is to say the carbon is to be used for such purposes as the refining of sugar, the clarifying of oils and the removal of bacteria and the like from liquids. Another object is to enable the by-products of the process to be recovered.

According to this invention a process for the production of vegetable charcoal of the kind described consists in intimately mixing a carbonaceous material of vegetable origin (such, for example, as sawdust) with calcium hydroxide (slaked lime), introducing the mixture into a retort, heating the mixture to a temperature of about 1000° C. or a clear cherry red until carbon monoxide ceases to be evolved, still maintaining the mixture at the high temperature for a further period (say up to half-an-hour), and thereafter treating the product to separate the lime from the charcoal.

Preferably according to this invention, the intimate mixing of the calcium hydroxide with the carbonaceous material is facilitated by the presence of a small proportion of water sufficient to conduct the calcium hydroxide into the capillary passages of the carbonaceous material. For example, in the case of dry sawdust it is convenient to add about its own weight of water, which enters the capillary passages of the sawdust, while still leaving the mass as a whole in a dry state.

The carbonaceous material used in this invention may be sawdust, peat, or the like. It should preferably be of a fibrous character. The material is in a state of subdivision, of which ordinary sawdust is a fair example. The state of subdivision should be such that each particle is in itself a porous body, i. e. the disintegration should not be of such a nature, or carried to such an extent, as to destroy entirely the capillary passages.

In effecting the intimate mixture of the carbonaceous material with the calcium hydroxide, it may be that sufficient water naturally exists in the carbonaceous material employed, but it not, the amount of water to be added should be sufficient to enable the calcium hydroxide to be carried by the water into the capillary passages of the carbonaceous material.

The following is a description by way of example of one method of carrying this invention into effect. 100 parts by weight of ordinary sawdust which would pass through meshes of one-thirtysecond of an inch wide (16 mesh I. M. M.) are mixed with 100 parts by weight of water which is absorbed by the sawdust to such an extent that the sawdust will still run through the fingers without leaving any water thereon. This moist sawdust is mixed with 100 parts by weight of calcium hydroxide.

The materials are mixed in a ball mill, edge runner mill or the like to ensure the intimate mixture, or in other words, to work the lime into the sawdust particles. It would appear that the movement of the water in the capillary passages of the sawdust, which is brought about by the action of the ball mill, results in the introduction of the calcium hydroxide into the capillary passages. The agitation in the ball mill may conveniently be carried out for about ten minutes.

The mixture is then dried (preferably by ordinary air drying). It is then introduced into a retort of any convenient form (preferably that described in my British patent specification No. 32481 of 1921). The introduction of the mixture into the retort in a dry state is important, because if the mixture in the retort or furnace were wet, the production of the distillates from the carbonaceous material would be injuriously affected.

The temperature of the charge is then gradually raised to about 1000° C. producing a clear cherry red (preferably not less than 1000° C.). Using the furnace described in British specification No. 32481 of 1921 with quarter-inch layers, the operation of heating the mixture to about 1000° C. takes about four minutes. This temperature is maintained until carbon monoxide ceases to be given off. After that stage the same temperature is still maintained for a further period, in this case about ten minutes.

In another example of the use of this invention 100 parts by weight of sawdust mixed with about 100 parts by weight of water and with approximately 75 parts by weight of calcium hydroxide are then treated as before, but in this case, in order to get the desirable activity of the resulting carbon, it is found necessary to maintain the high temperature (about 1000° C.) for a period of about half-an-hour after the carbon monoxide ceases to be given off. It appears that a reduction of the quantity of calcium hydroxide below, 100 parts by weight to 100 parts by weight of the sawdust increases the time required for heating the carbon after the carbon monoxide ceases to be given off.

During the process of heating, the products of destructive distillation of the carbonaceous material are cooled and condensed in any well-known way.

In order to produce the desired results it is important that the necessary high temperature should be imparted to every particle of the mass for the time stated, and the means employed should be adequate for this purpose.

If the mass were allowed to cool immediately the evolution of carbon monoxide ceased, an active charcoal would be obtained, but where the mass is uniformly maintained at the high temperature for the further period above referred to the charcoal produced is found to be much more active.

After the heat treatment, the mass is allowed to cool, and the lime is separated from the charcoal by mechanical means, by a process of concentration, or by dissolving the lime in a solution of an acid, such as hydrochloric acid, or nitric acid.

It may be that a single heat treatment may be insufficient to give the results required from particular types of carbonaceous material. In an alternative method of carrying out this invention the mass, after the heat treatment, may be allowed to cool, then moistened with sufficient water to slake the quick-lime formed during the first heat treatment, and thereafter raised again to a temperature of about 1000° C. in the same way as in the first treatment, after which the cooling and separation of the lime proceed as before.

In a second alternative process embodying this invention, 100 parts by weight of carbonaceous material, such as sawdust, are mixed with about 75 parts by weight of calcium carbonate (with or without the presence of water). The mixture is then dried by air drying to such a state as is obtained by air drying, and it is introduced into the retort and the whole mass is heated so that every particle of the mixture may be raised to a temperature of about 1000° C., the distillates or by-products from the carbonaceous material being recovered meanwhile. The resulting mass, which will consist of charcoal, quicklime, and possibly a small residuum of calcium carbonate, is then damped to effect the slaking of the quick-lime. This mass is again air-dried and again heated, so that every particle may be raised to a temperature of about 1000° C., which temperature is maintained for about half-an-hour after the carbon monoxide has ceased to be evolved. The cooling of the mass and the separation of the lime from the charcoal then proceed as before. This latter process gives a yield which is much lower than that afforded by the first process described.

What I claim as my invention and desire to secure by Letters Patent is:—

1. The process for the production of active charcoal which includes the steps of intimately incorporating in a porous carbonaceous material, moist by reason of absorbed water, an oxidic calcium compound, retorting the material at about 1000° C. until carbon monoxide ceases to be evolved, still maintaining the high temperature of the mixture for a further period sufficient to materially increase the activity of the product and thereafter treating the product to remove lime.

2. A process for the production of active charcoal which includes the steps of intimately incorporating calcium hydroxide into a porous carbonaceous material in the presence of a sufficiency of water to carry the calcium hydroxide into the pores of the carbonaceous matter but to leave no unabsorbed water, retorting the material at about 1000° C. until carbon monoxide ceases to be evolved, still maintaining the mixture at the same temperature for a further period sufficient to materially increase the activity of the product and thereafter treating the product to remove lime.

3. The process for the production of active charcoal which includes the steps of intimately incorporating calcium hydrate into sawdust that is moist by reason of absorbed water, retorting the material at about 1000° C. until carbon monoxide ceases to be evolved, still maintaining the mixture at the same temperature for a further period sufficient to materially increase the activity of the product and thereafter treating the product to remove lime.

4. The process for the production of active charcoal which includes the steps of intimately incorporating calcium hydrate into a carbonaceous material that is moist by reason of absorbed water, retorting the material at about 1000° C. until carbon monoxide ceases to be evolved, still maintaining the mixture at the same temperature for half-an-hour and thereafter treating the product to remove lime.

5. A process for the production of active charcoal which includes the steps of intimately incorporating calcium hydroxide into a porous carbonaceous material in the presence of a sufficiency of water to carry the calcium hydroxide into the pores of the carbonaceous matter but to leave no unabsorbed water, air-drying the material, retorting the material to a clear cherry red heat until carbon monoxide ceases to be evolved, still maintaining the mixture at the same temperature for a further period sufficient to materially increase the activity of the product and thereafter treating the product to remove lime.

6. The process for the production of active charcoal which includes the steps of intimately mixing in a grinding mill having a rolling action calcium hydrate and a porous carbonaceous material that is moist by reason of absorbed water, retorting the material at about 1000° C. until carbon monoxide ceases to be evolved, still maintaining the mixture at the same temperature for a further period sufficient to materially increase the activity of the product and thereafter treating the product to remove lime.

7. A process for the production of active charcoal which includes the steps of intimately mixing in a grinding mill having a rolling action saw-dust with calcium hydroxide in the presence of a sufficiency of water to carry the calcium hydroxide into the pores of the sawdust but leaving no unabsorbed water, air-drying the material, retorting the material to a clear cherry red heat until carbon monoxide ceases to be evolved, still maintaining the mixture at the same temperature for a further period sufficient to materially increase the activity of the product, and thereafter treating the product to remove lime.

8. A process for the production of active charcoal in which carbonaceous matter is intimately mixed in a grinding mill with an oxidic calcium compound so as to produce a mixture containing no unabsorbed water, the material is retorted a clear cherry red heat, allowed to cool, slacked with water, again retorted a clear cherry red heat until carbon monoxide ceases to be evolved, still maintained at the same temperature for a further period sufficient to materially increase the activity of the product, cooled and treated to remove lime.

9. A process for the production of active charcoal in which sawdust is intimately mixed in a grinding mill having a rolling action with an oxidic calcium compound in the presence of a sufficiency of water to carry the calcium compound into the pores of the material so as to produce a mixture containing no unabsorbed water, the material is retorted at about 1000°C., allowed to cool, slaked with water, again retorted at about 1000°C. until carbon monoxide ceases to be evolved, still maintained at the same temperature for a further period sufficient to materially increase the activity of the product, cooled and treated to remove lime.

10. The process for the production of active charcoal which includes the steps of intimately incorporating an oxidic calcium compound into moist sawdust in a proportion not less than 75% by weight of the sawdust, retorting the material at a clear cherry red heat until carbon monoxide ceases to be evolved, still maintaining the mixture at the same temperature for a further period sufficient to materially increase the activity of the product and thereafter treating the product to remove lime.

11. A process for the production of activated charcoal which includes the steps of intimately mixing in a grinding mill having a rolling action, sawdust with calcium hydroxide in a proportion not less than 75% by weight of the sawdust in the presence of a sufficiency of water to carry the calcium hydroxide into the pores of the sawdust but leaving no unabsorbed water, air drying the material, retorting the material at substantially 1000° C. until carbon monoxide ceases to be evolved, still maintaining the mixture at the same temperature for a further period sufficient to materially increase the activity of the product, and thereafter treating the product to remove lime.

In testimony whereof I affix my signature.

LEONARD HUGH BONNARD.